July 25, 1950 W. M. BARKER ET AL 2,516,361

VOICE FREQUENCY SIGNAL DEVICE

Filed Aug. 21, 1945 2 Sheets-Sheet 1

INVENTORS
W.M.Barker and R.H.Bechtold
BY
Neil W. Preston,
Their ATTORNEY

VOICE FREQUENCY SIGNAL DEVICE

Filed Aug. 21, 1945 2 Sheets-Sheet 2

INVENTORS
W.M.Barker and R.H.Bechtold
BY Neil W. Preston,
Their ATTORNEY

Patented July 25, 1950

2,516,361

UNITED STATES PATENT OFFICE 2,516,361

VOICE FREQUENCY SIGNAL DEVICE

William M. Barker, Greece, and Robert H. Bechtold, Irondequoit, N. Y., assignors to General Railway Signal Company, Rochester, N. Y.

Application August 21, 1945, Serial No. 611,894

8 Claims. (Cl. 179—2)

This invention relates to communication apparatus for use in a centralized traffic control system on railroads, and more particularly pertains to an electronic calling means associated with the telephone apparatus in such a system.

In centralized traffic controlling systems for railroads, a pair of line wires are usually employed for transmitting control and indication codes between a central office and one or more outlying field stations to effect the control of the traffic governing devices at such field stations as well as indicating their conditions to the operator in the central office. In addition to such code controlling apparatus, it is also desirable to provide telephone communication over the same pair of line wires between the central office and various of the field stations. Obviously such a telephone communication organization must be arranged to operate without interference between it and the code type system with which it is associated. It is also desirable to provide means whereby the operator at the central office may render his telephone equipment inactive subject to a calling device, and it is proposed in accordance with the present invention to effect the operation of such a calling device merely by a trainman speaking into the microphone of a telephone set at any one of the outlying field stations.

In view of the above consideration, it is apparent that the calling device must be arranged to be non-responsive to the various code pulses that are present upon the line wires with which it is associated and yet be effective for the purposes intended. In such a system there are numerous transient potentials on the line wires which may be due to adjacent line wires, lightning surges, and the like, in view of which it is further proposed to organize such a calling system which is practically immune to transient conditions but is highly responsive to voice actuation, especially the voice tones within the range of 500 to 1500 cycles per second.

It is further proposed to arrange the calling device in such a way that once it is set into operation it will remain in operation until manually cancelled; or on the other hand cause it to be so set as to be rendered effective only during the calling periods.

Other objects, purposes and characteristic features of the present invention will be in part obvious from the accompanying drawings, and in part pointed out as a description of the invention progresses.

In describing the invention in detail, reference will be made to the accompanying drawings, in which like reference characters will be used to designate corresponding parts throughout the several views, and in which—

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays, electron tubes, and other devices have been illustrated in a conventional manner, and symbols are used to indicate these various devices.

While certain features of the present invention may be applicable to various types of systems for effecting distinctive controls, the system of the present invention has been more particularly shown as applied to a centralized traffic controlling system for railroads.

Figure 1:
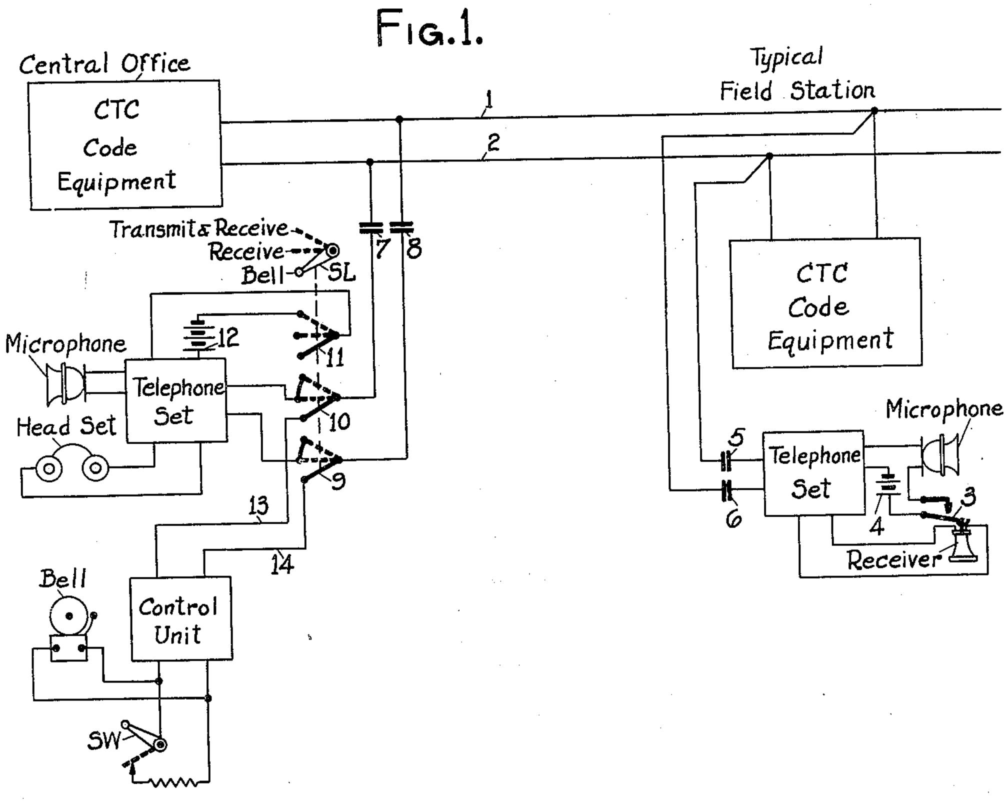
Fig. 1 illustrates diagrammatically a general organization of centralized traffic controlling system to which the calling system of the present invention has been applied.

With reference to Fig. 1 of the accompanying drawings, a pair of line wires 1 and 2 are shown as interconnecting a central office including centralized traffic control code equipment and the various field stations also having associated centralized traffic controlling code equipment. Although such code equipment may be of various types, it is considered for the purposes of the present invention that it may be of the type shown for example in the prior application of Hailes et al., Ser. No. 484,728, filed April 27, 1943, which has resulted in Patent No. 2,399,734, dated May 7, 1946, in which the field station code equipment at the respective locations is placed in multiple across the line wires 1 and 2.

At each field station, one of which has been typically shown in Fig. 1, it is assumed that a suitable telephone set is also connected in multiple across the line wires 1 and 2. This telephone set may be of any conventional well known type including a receiver and microphone, with the usual hook operated contact 3 for disconnecting a battery 4 while the receiver 3 is in place, but rendering the telephone active whenever the receiver is removed. This telephone equipment has been indicated as connected across the line wires 1 and 2 through blocking condensers 5 and 6. These condensers are for relatively high voltages and are used to prevent break-downs in the ordinary low voltage telephone type lightning arrester and other telephone equipment of the telephone set from short-circuiting the line wires 1 and 2 and thus interfere with the operation of the code type CTC system.

At the central office, a telephone set of a similar type is shown as including a microphone, a head set and a suitable battery. Associated with this apparatus is the control unit of the calling system of the present invention illustrated as connected to a suitable conventional bell. A switch SW is shown for the purpose of determining whether the bell shall continue to ring until the switch SW is open when the bell is once actuated; or whether the bell shall ring only while receiving an actuating signal.

Under normal conditions, a selecting lever SL is in a position designated as "bell" in which the control unit is connected to the line wires 1 and 2 through the blocking condensers 7 and 8; but when the lever SL is moved to the position designated "receive," then the control unit is disconnected from the line wires and the telephone set is rendered active for reception by reason of the movement of contacts 9 and 10 from their normal positions to their intermediate positions. When the lever SL is moved to the position designated "transmit and receive," then the telephone set is conditioned for both transmission and reception. This is because the contacts 9 and 10 continue to connect the receiving apparatus of the telephone set while the contact 11 connects the battery 12 so as to render the telephone set active for transmission.

Let us assume that the selecting lever SL is in the calling position designated "bell" thus connecting the line wires through contacts 9 and 10 and wires 13 and 14 to the control unit. In this condition, whenever a trainman at a remote field station such as the typical field station illustrated removes the receiver from the associated hook 3 and speaks into the microphone, suitable audio frequency signals are impressed upon the line wires 1 and 2 which are supplied to the control unit for causing the actuation of the bell advising the operator at the central office that he is wanted on the telephone. He can then actuate the selecting lever SL to a receiving position or to a transmit and receiving position. In either case, he can then communicate with the operator at the remote field station.

Figure 3:
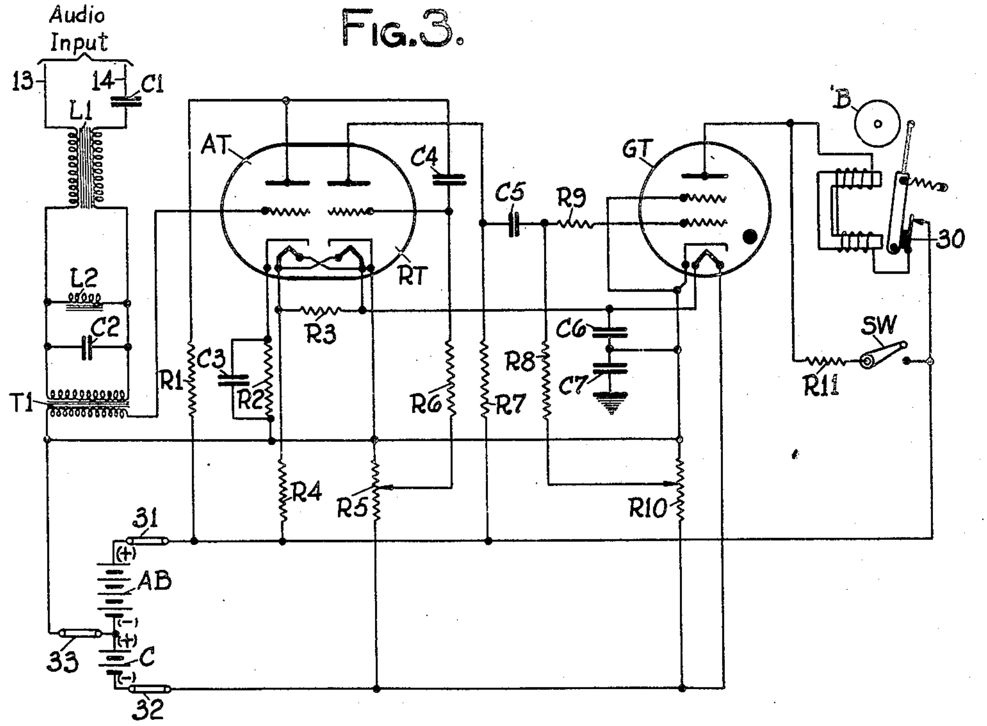
Fig. 3 shows the circuit organization of a control unit embodying the present invention and located at the central office of Fig. 1 for the reception of the different calls from the field stations.

The operation of the control unit can best be understood by more specifically considering the detail structure of such a unit with reference to Fig. 3, where the wires 13 and 14 of Fig. 1 are shown extending to a filter circuit including a condenser C1, a reactance L1 having windings serially connected in both wires of the filter circuit extending to the primary winding of the transformer T1. In multiple with the primary winding of the transformer T1 is a suitable reactance L2 and a suitable condenser C2. This filter circuit organization is constructed to act as a band-pass filter for an audio frequency input especially for the reception of frequencies between 500 and 1500 cycles per second. However, it should be understood in this connection, that the present invention might be employed with other frequencies than those designated and in some cases it might be desirable to employ the characteristic features of the present invention with frequencies considerably higher than the audio range. Also, in connection with this band-pass filter organization, it should be understood that it may act as a terminating impedance for the line circuit in accordance with the proper engineering practices for terminating line circuits.

The secondary of transformer T1 supplies energy to the grid-cathode circuit of a class A triode amplifier AT, the plate of which is fed through a load resistor R1 from the plate and cathode supply battery designated AB since it is employed both as an "A" battery and a "B" battery. The control grid of this class A amplifier is biased by the resistor R2 having associated therewith a by-pass condenser C3, which condenser C3 has its value so selected that there is a tendency for the amplifier to degenerate at frequencies below 500 cycles per second. This feature of reducing the amplifying gain of the class A amplifier at the lower frequencies assures added protection against operation of the bell by such low frequency transients as may be on the line wires 1 and 2 as a result of the code pulses applied thereto by the centralized traffic controlling system.

The output of the class A amplifier is fed to the grid-cathode circuit of a class B triode amplifier RT located within the same envelope as the class A amplifier. This input connection between the two tubes is supplied through the condenser C4 and a resistor R6 connected through a potentiometer R5 to a suitable biasing battery designated C. The plate of this class B amplifier or rectifier RT receives energy from the source AB through resistor R7.

A gas filled tube GT, sometimes termed a thyratron tube, is supplied with the rectified output of the class B amplifier RT through the condenser C5. This gas filled tube GT has its cathode circuit connected to the cathodes of the tubes AT and RT, and also connected through condenser C7 to ground and to the heater circuits through condenser C6. These condensers C6 and C7 are provided for preventing any alternating current potentials or transient voltages from existing between the cathode and the heater elements, or between the cathodes and the metal envelopes in which the devices may be housed.

The control grid of this gas filled tube GT is supplied with suitable bias through a resistor R9 in series with a resistor R8 connected to the movable tap of a potentiometer R10 which in turn is connected in multiple across the battery source C. This gas filled tube GT has its plate-cathode circuit connected in series with the windings of a suitable bell B, its interrupter contact 30, and the battery AB. The tube GT has been indicated as being of the shield-grid thyratron type for the purpose of reducing the grid current of the tube and protecting the control grid from the heat of the arc while the tube is conducting. However, it should be understood that any suitable gas tube may be employed with the proper values of resistances and capacitances.

The heater element of the gas filled tube GT is supplied with energy from the batteries AB and C in series through resistance R3, shunted by filaments of AT and RT, and resistance R4. It should be understood that the heater elements of the tubes AT, RT and GT may be supplied with energy through other suitable circuit arrangements, the specific arrangement shown being especially adaptable for one specific set of tubes.

As shown, a resistor R11 may be connected in multiple with the bell B when switch SW is closed. This will maintain the bell in operation because a continuous plate voltage does not allow the interruption of the conducting operation of the gas filled tube GT once it has been fired. However, with the switch SW open, the bell operates only when audio signals are received, as will be presently described in greater detail.

The connectors 31, 32 and 33 have been shown for disconnecting the battery sources AB and C from the circuit organization, but these connectors which may be a suitable three pole switch have been shown normally closed, since the device is normally conditioned for operation.

It is believed that further description will be best set forth from the standpoint of operation of the circuit organization of Fig. 3.

The audio input supplied on wires 13 and 14 is fed through the band-pass filter above described and through the step up transformer T1 to the grid-cathode circuit of the class A amplifier tube AT. This tube is supplied with plate potential through the resistor R1 from the battery AB. The voltage supply to the tube is sufficiently low so that in the event the audio signals exceed a predetermined amplitude, the tube becomes saturated, so to speak, and its output limited to a particular peak value. In other words, this amplifier tube AT serves both the purpose of amplification and also the purpose of a limiter. Thus, the signals applied to the rectifier tube RT will never assume values exceeding a predetermined amount, although there may be variations in the signals applied to the rectifier tube RT below such predetermined value.

Figure 4:
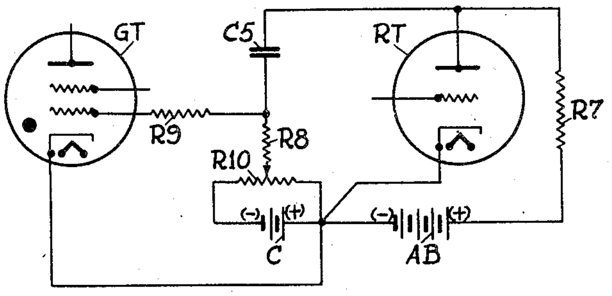
Fig. 4 is a diagrammatic simplification of certain portions of the circuit organization shown in Fig. 3.

Before considering the operation of the rectifier and gas filled tube upon the reception of an audio signal, it is convenient to refer to Fig. 4 which is a simplification of the circuit for the condenser C5.

Referring to either Fig. 3 or Fig. 4, it will be seen that the condenser C5 is charged through a circuit including the resistor R7, resistor R8 and a portion of the resistor R10 in accordance with the particular setting of the potentiometer. With the condenser C5 fully charged and assuming a stable condition, the bias voltage applied to the control grid of the gas filled tube GT is determined by the adjustment of potentiometer R10 which is normally set at a value sufficiently negative with respect to the cathode as to prevent ionization of the gas filled tube GT. In other words, with the condenser C5 in a stable condition, it has no affect on the normal bias of the control grid of the gas filled tube GT.

Whenever an audio signal is received by the rectifier tube RT, it is apparent that a succession of half waves of such signal will flow through the plate-cathode circuit of the rectifier tube RT. This plate-cathode current is made up of two components, namely, the current which is supplied from the battery AB through the resistor R7, and the current which is supplied through the positive charge of the condenser C5.

Figure 5:
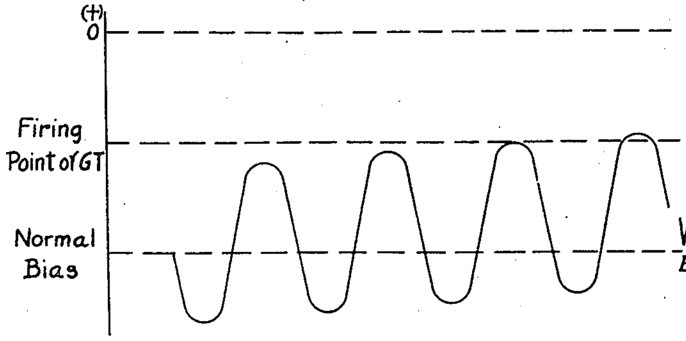
Fig. 5 is a graphic illustration of the operation of a portion of the circuit organization illustrated in Fig. 3 and shown by an equivalent diagram in Fig. 4.

Referring to Fig. 4 it can be easily seen that the plate-cathode circuit of the tube RT is in effect normally shunting the condenser C5 with a variable resistance which is reduced to a relatively low value when the tube RT is conducting. Since the effective conducting resistance of the rectifier tube RT is less than the resistance of the resistor R7, then the reception of an audio signal results in a succession of unequal discharging and charging operations applied to said condenser C5, i. e. between each successive discharge of the condenser C5 is a period of recharging of lesser degree, with the result that the condenser C5 is gradually discharged to a point at which its terminal connected to the control grid of the tube GT becomes sufficiently less negative during the next charging period to allow the tube GT to become conductive. This has been illustrated in the graphic diagram of Fig. 5 showing that the normal bias of the tube with the condenser C5 normally charged is considerably below the firing or conducting point of the gas filled tube. Each of the successive discharges of the condenser C5 results in swinging the control grid of the tube GT negative because such discharging current flows through the resistor R8 making its upper terminal more negative. But when such discharge period is over, then the condenser C5 begins to charge which causes current to flow through resistor R8 in the opposite direction and thus causes a positive swing on the control grid of the gas filled tube GT. The first such positive swing of the control grid is not effective to fire the tube. But since the discharging of the condenser C5 is effected in a succession of half cycles of signal reception, and since the recharging during each half cycle is less than the discharge, then the condenser C5 ultimately reaches such a discharged condition that the next charge is of a sufficient current value to cause a potential drop across resistor R8 that acts to make the control grid of the tube GT swing towards the positive above the firing point.

The firing of the gas filled tube GT causes current flow through the windings of the bell and interrupter contact 30 from the battery AB which causes the bell to ring. The acting of the bell to periodically open the circuit at the interrupting contact 30 in effect reduces the potential on the plate of the gas filled tube GT to substantially zero at recurring intervals. So that if the audio signal ceases, then the control grid of the gas filled tube GT is restored to its negative bias by reason of the charging of the condenser C5; but so long as the audio signal continues to be received, then the bell continues to ring.

If, however, the switch SW is closed, then the resistor R11 is connected in multiple with the bell, so that a continual potential is maintained on the plate of the tube GT, so that once it is rendered conductive, it remains conductive although the audio signal ceases to be received and the control grid of the tube GT is restored to its negative condition. In such a case, the bell continues to ring until the switch SW is opened.

This organization of the control of the gas filled tube GT by the rectifier tube RT provides that there is a delay time between the initially received audio signal and the actual firing of the gas filled tube GT. In other words, a succession of audio frequency cycles must be received in order for the gas filled tube to be fired.

This time delay feature of the present invention is accomplished by regulating the ratio between the charge and discharge circuit of the condenser C5, and thus makes it possible to provide a considerably greater time delay with a predetermined capacity of condenser C5 than could possibly be provided by other organizations in which a single discharge or charge of a condenser is employed for effecting operation of a tube.

Since the amplifying tube AT also acts as a limiter tube, then it is apparent that there is a certain minimum time which may be measured by the organization regardless of the amplitude of the audio signals impressed upon the input of the organization. This protects against the erroneous operation of the bell by transients which may in amplitude exceed an audio signal, but in time duration fail to meet the requirements of an audio signal, especially since transients are not usually of the regular recurring type such as an audio signal would be.

Figure 2:
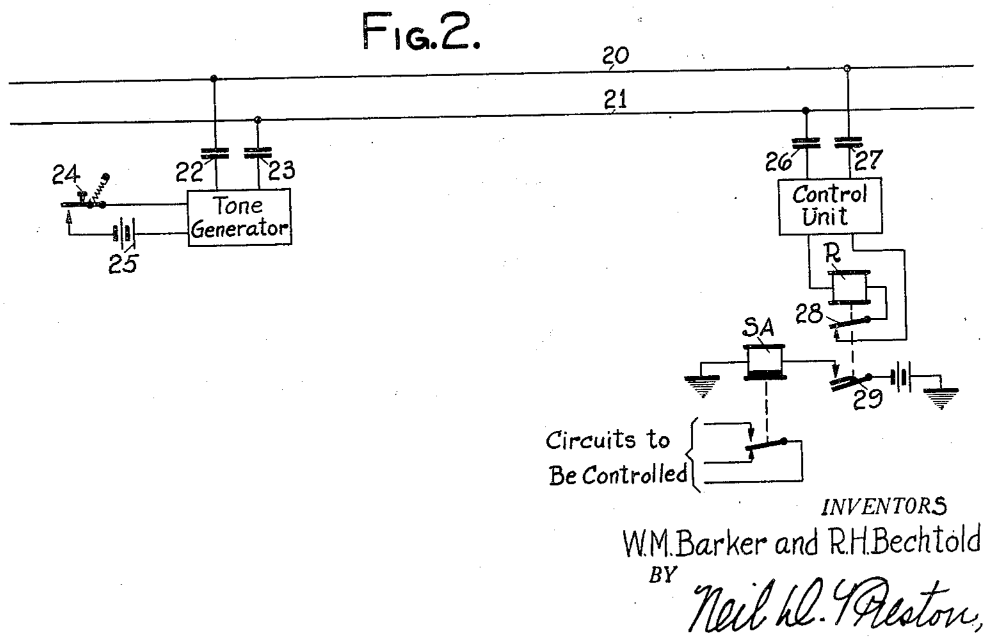
Fig. 2 illustrates a system of control to which the present invention may be applied for other purposes than merely a calling signal.

It should be apparent that the present invention as embodied in the circuit organization of Fig. 3 may be employed for other purposes than ringing a bell; and also the general organization of control may be applied to effect controls by means other than the spoken voice. This has been illustrated in Fig. 2 where the line wires 20 and 21 have been shown as having a tone generator connected thereto through condensers 22 and 23 which tone generator can be set into operation at the closure of the self restoring push button 24 and the connection of the battery 25. This tone generator may be of any suitable electronic type arranged to supply a tone of a frequency corresponding to the frequency for which the filter circuit is provided in connection with the control unit remotely located and constructed in connection with the present invention as disclosed in Fig. 3. Such control unit is interconnected to the line wires 20 and 21 through the condensers 26 and 27. The only difference in this control unit organization is that the bell B has been replaced by a relay R and the switch SW has been entirely eliminated. This relay R has a back contact 28 which causes this relay to oscillate up and down, so to speak, whenever the gas filled tube GT (of Fig. 3) is conductive due to the reception of a tone over the line wires. While the relay R is deenergized, the relay SA is deenergized because the contact 29 of relay R is open, but whenever the relay R is caused to oscillate, the contact 29 being of the make-before-break type, acts to energize the relay SA substantially continuously. However, it may be that its circuit is broken momentarily during the successive energization of the relay R. But the relay SA is relatively quick to pick up and slow to release, and so that its contacts are picked up during the time that the relay R is oscillating. In this way, the relay SA may be caused to be picked up or released in accordance with the actuated or released condition of the push button 24. The contacts of the relay SA may be employed to govern any suitable circuits as desired.

Although the present invention has been shown as embodied in an organization particularly adaptable for the transmission of controls over a line circuit by the use of audio frequency or tone signals, it should be understood that supersonic frequencies may also be employed; and in fact control signals of the low radio frequency type may be employed in place of the audio tone signals discussed. The use of radio frequencies would of course require that the filter organization be adapted for such frequencies. Also, it can be appreciated that certain characteristics of the present invention might be well employed with radio systems of communication and are not limited to use with an organization employing line wires.

Having described a system of control associated with a communication system as one embodiment of the present invention, it is desired to be understood that this form is selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the invention except as limited by the appended claims.

What we claim is:

1. In a system for giving a distinctive indication in response to the reception of a signal including a plurality of successive cycles, a gas filled discharge tube having a control grid, means normally biasing said control grid with a negative potential sufficient to prevent firing of said tube, means effective only in response to the reception of a plurality of said cycles for changing the potential of said control grid to a point where said tube fires to allow current flow in its plate-cathode circuit, indicator means associated with said tube and included in its plate-cathode circuit in series with a direct current source of potential, and manually governed means for effecting the deenergization of said plate-cathode circuit only providing said signal has ceased, whereby the energization of said indicator persists when once initiated regardless of the cessation of said signal until actuation of said manually governed means.

2. In an indicator control system rendered active in response to the reception of a signal constituting a plurality of successive cycles, a condenser, a circuit for charging said condenser including two resistors one connected on each side of a direct current source and connected to the terminals of said condenser, a gas filled tube having a control grid connected to the negative terminal of said condenser and normally biased negatively beyond the cut-off point of said tube, a rectifier tube having a control grid governed by the reception of a signal and having a plate-cathode circuit connected in shunt with one of said resistors and said condenser, whereby each positive cycle of said signal renders said rectifier tube conductive to shunt said condenser and cause it to discharge through said one resistor in such a direction as to render the control grid of said gas filled tube more negative, and whereby each negative cycle of said signal renders said rectifier tube nonconductive so as to cause a recharging of said condenser by current flow causing said one resistor to effect a positive potential drop for swinging the control grid of said gas filled tube more positive, said discharging of said condenser being at a faster rate than its charging rate through its charging circuit, whereby said gas filled tube is rendered conductive only after the reception of a plurality of positive cycles of a signal, and an indicator controlled by the plate-cathode circuit of said gas filled tube.

3. In an indicator control system governed in accordance with the reception of a signal comprising a plurality of cycles, a condenser, a circuit for charging said condenser including a direct current source and a relatively high impedance resistor, a gas filled tube having a control grid connected to the negative terminal of said condenser and related to its cathode so as to be normally biased beyond the cut-off point of said tube, a rectifier tube having a control grid governed by the reception of a frequency signal and having a plate-cathode circuit connected to shunt said condenser, whereby each positive cycle of said signal renders said rectifier tube conductive to reduce the charge of said condenser, and an indication means governed by the plate-cathode circuit of said gas filled tube.

4. In a control system including a pair of line wires extending between two spaced locations, means at one of said locations for applying signals in the audible frequency range to said line wires, signal receiving means at the other location comprising an amplifier including an electron tube having a cathode bias to act as a limiter to prevent electric impulses greater than a predetermined amplitude from being passed by such amplifier, a rectifying electron tube governed by the output of said amplifier, a gas discharge type tube having a control grid and a cathode-anode circuit, time delay circuit biasing means connecting the control grid of said gas tube to the output of said rectifier tube, said time delay circuit biasing means delaying firing of said gas tube in response to the output of said rectifier tube for a predetermined time longer than a plurality of cycles of the signal being received, and indication means included in the cathode-anode circuit of said gas tube.

5. In a centralized traffic controlling system for railroads, a control office and a plurality of remote field stations, a pair of line wires extending between the control office and the field stations, code transmitting means at the control office and at each of the field stations for transmitting control and indication code pulses over said line wires, means at each of said field stations for applying an audio-frequency signal on said line wires including a conventional telephone set, a normally inactive signal at the control office, and electro-responsive means at the control office for actuating said signal in response to the reception of audio-frequency signal current received over said line wires from any one of the field stations, said electro-responsive means including a limiting amplifier, an electron control tube having a control grid, and time delay circuit means forming a controlling interconnection between the output of said amplifier and the grid of said control tube, said time delay circuit means delaying conduction through said control tube in response to output from said amplifier for a time interval longer than the transient effects due to the application and removal of said code pulses to said line wires.

6. In a centralized traffic controlling system for railroads, a control office and a plurality of field stations, a pair of line wires extending between the control office and the field stations, code transmitting means at the control office and at each of the field stations for transmitting control and indication code pulses over said line wires, means at each of the field stations including a conventional telephone for impressing audio-frequency signal current on said line wires, a normally inactive telephone transmitter and receiver unit at the control office, a normally inactive audible signal device at the control office, a transformer at the control office, an electron tube biased beyond cutoff and responsive to variations in voltage across the secondary of said transformer, a gas tube having its grid normally biased to be nonconductive and a plate circuit including said audible signal device, a time delay circuit means including a condenser and connecting the output of said electron tube and the grid of said gas tube, and manually operable means for alternately connecting said transformer and said telephone receiver and transmitter unit to said pair of line wires.

7. In a communication system for transmitting over a line circuit voice messages at audio-frequencies and also code pulses, a voice responsive calling device comprising, a vacuum tube amplifier connected to the line circuit, circuit means controlling said amplifier to limit its output to a level comparable with the output of said amplifier for audio signals of normal intensity for voice calling, a triode having its grid biased beyond cutoff and having its input connected to the output of said amplifier, a grid controlled gas tube, a grid circuit organization for said gas tube connected with the plate circuit of said triode and including electrical time delay means, said time delay means including a condenser and resistors connected to the output of said triode for charging and discharging said condenser over circuit paths of different resistance as said triode responds to the output of said amplifier, said grid circuit organization providing a grid potential for firing said gas tube only after several charging and discharging operations of said condenser in response to a number of cycles of voltage variations due to a change in the energization of the line circuit, and a calling signal device connected with the plate circuit of said gas tube and actuated when said tube is conductive, whereby a calling signal device may be operated by the sustained audio-frequencies of voice calling but does not respond to the transient effects of code pulses on said line circuit.

8. A communication system comprising in combination, a control office and a plurality of field stations, a pair of line wires connecting the control office and the field stations, code communication apparatus connected to said line wires at the control office at each of the field stations, means at each of the field stations including a telephone set for applying audio-frequency signal current to said line wires for transmission to the control office, a limiting amplifier at the control office connected to said line wires, said amplifier limiting its output level to a value comparable with its output for normal audio-frequency signals, a condenser at the control office, a normally inactive signal at the control office, an electronic control tube for energizing said signal when said tube is rendered conductive, a charging circuit for said condenser including a resistor, a discharging circuit including said resistor in said charging circuit for said condenser and a source of potential to bias said control tube normally for nonconduction, the voltage drop across said resistor due to charging current of the condenser when discharged to a predetermined level reducing the normal bias for said control tube to make it conductive, a rectifying tube connected to the output of said amplifier for alternately establishing said charging and discharging circuits for said condenser, whereby said normally inactive signal at the control office is actuated by a sustained audio-frequency but not by the transient effects of code pulses on said line wires.

WILLIAM M. BARKER.
ROBERT H. BECHTOLD.

(References on following page)

REFERENCES CITED

The following references are of record in the file of this patent:

UNITED STATES PATENTS

| Number | Name | Date |
|---|---|---|
| 322,808 | Delaney | July 21, 1885 |
| 1,672,049 | Almquist | June 5, 1928 |
| 1,698,770 | Ohl | Jan. 15, 1929 |
| 1,977,256 | Swort | Oct. 16, 1934 |
| 2,086,965 | Shepard | July 13, 1937 |
| 2,092,861 | Swart | Sept. 14, 1937 |
| 2,173,154 | Bernard | Sept. 19, 1939 |
| 2,202,474 | Vroom | May 28, 1940 |
| 2,206,446 | Bereskin | July 2, 1940 |
| 2,265,203 | Six | Dec. 9, 1941 |
| 2,310,105 | Michel | Feb. 2, 1943 |
| 2,321,370 | Dubilier | June 8, 1943 |
| 2,329,048 | Hullegard | Sept. 7, 1943 |
| 2,330,593 | Kenefake | Sept. 28, 1943 |
| 2,354,086 | MacKay | July 18, 1944 |
| 2,395,168 | Crabtree | Feb. 19, 1946 |

FOREIGN PATENTS

| Number | Country | Date |
|---|---|---|
| 558,260 | Great Britain | Dec. 29, 1943 |